Patented Oct. 21, 1924.

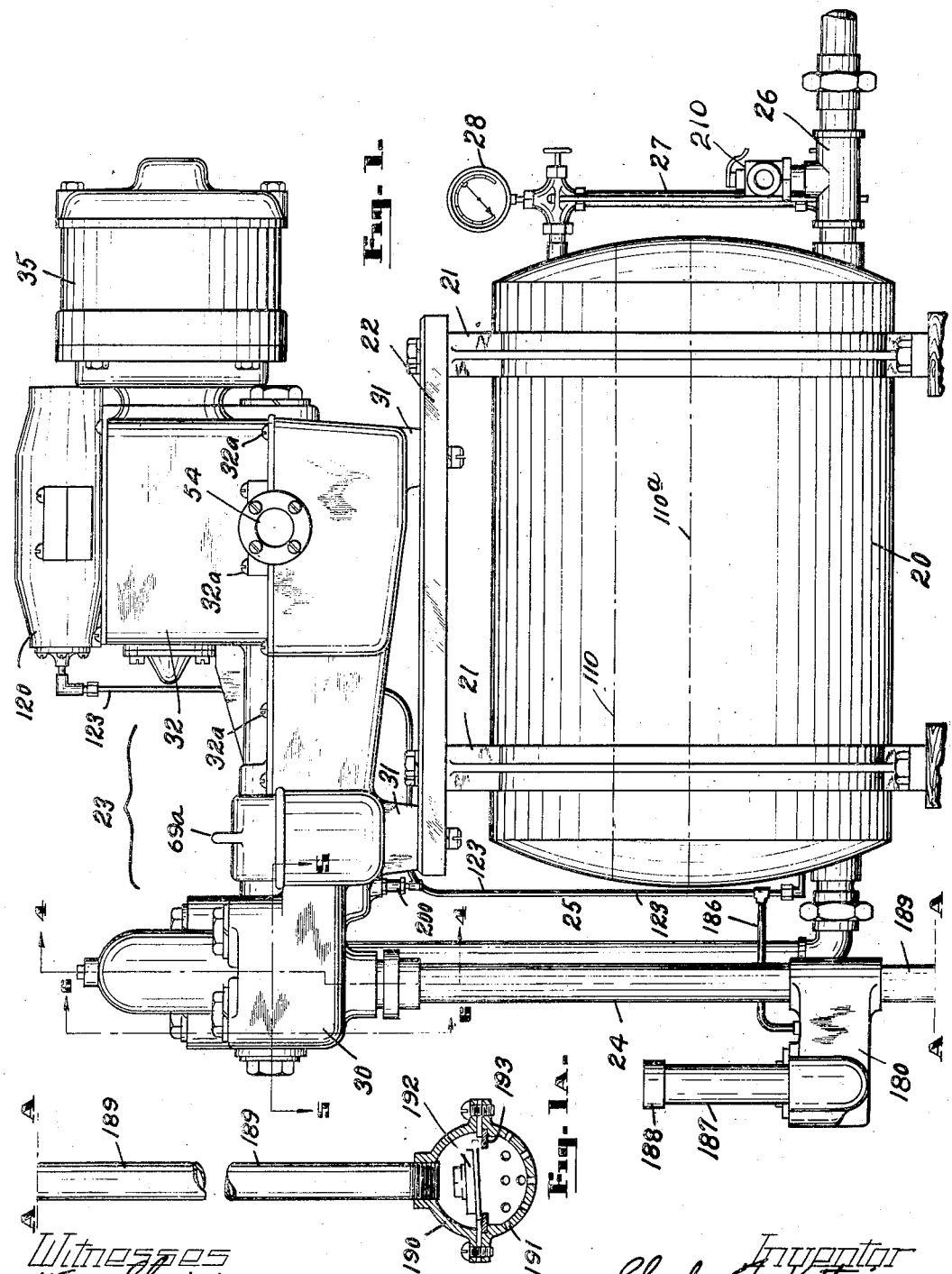

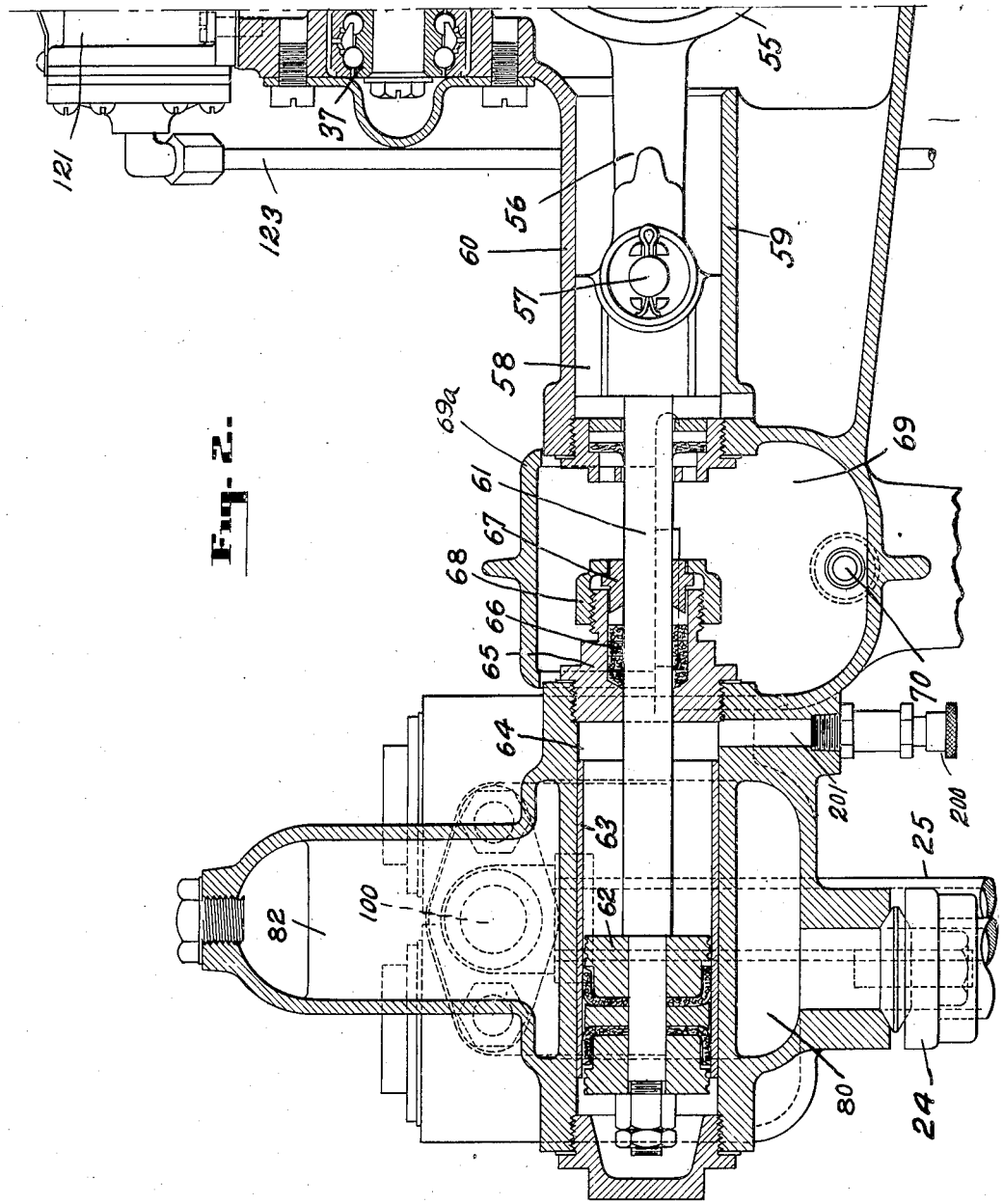

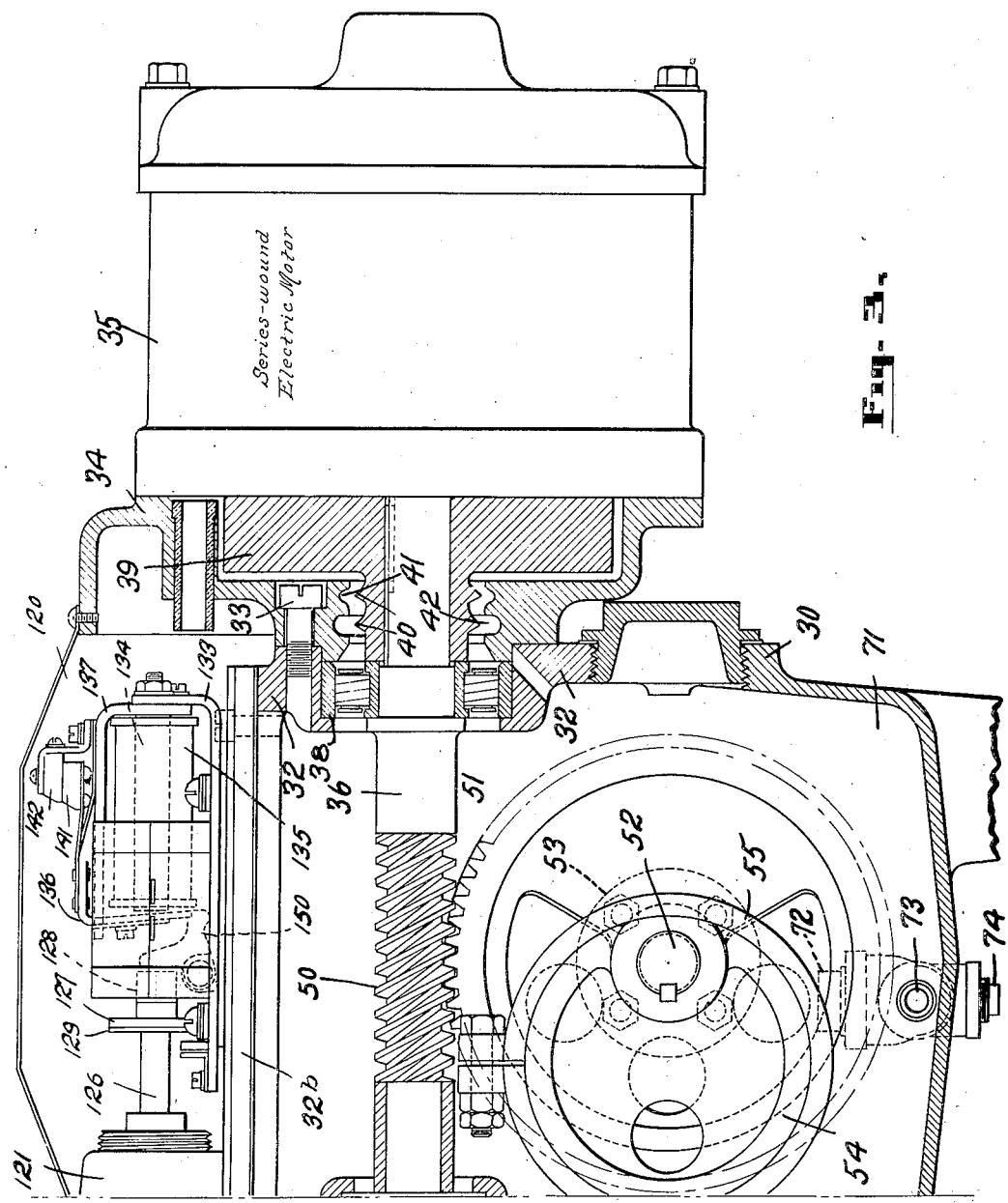

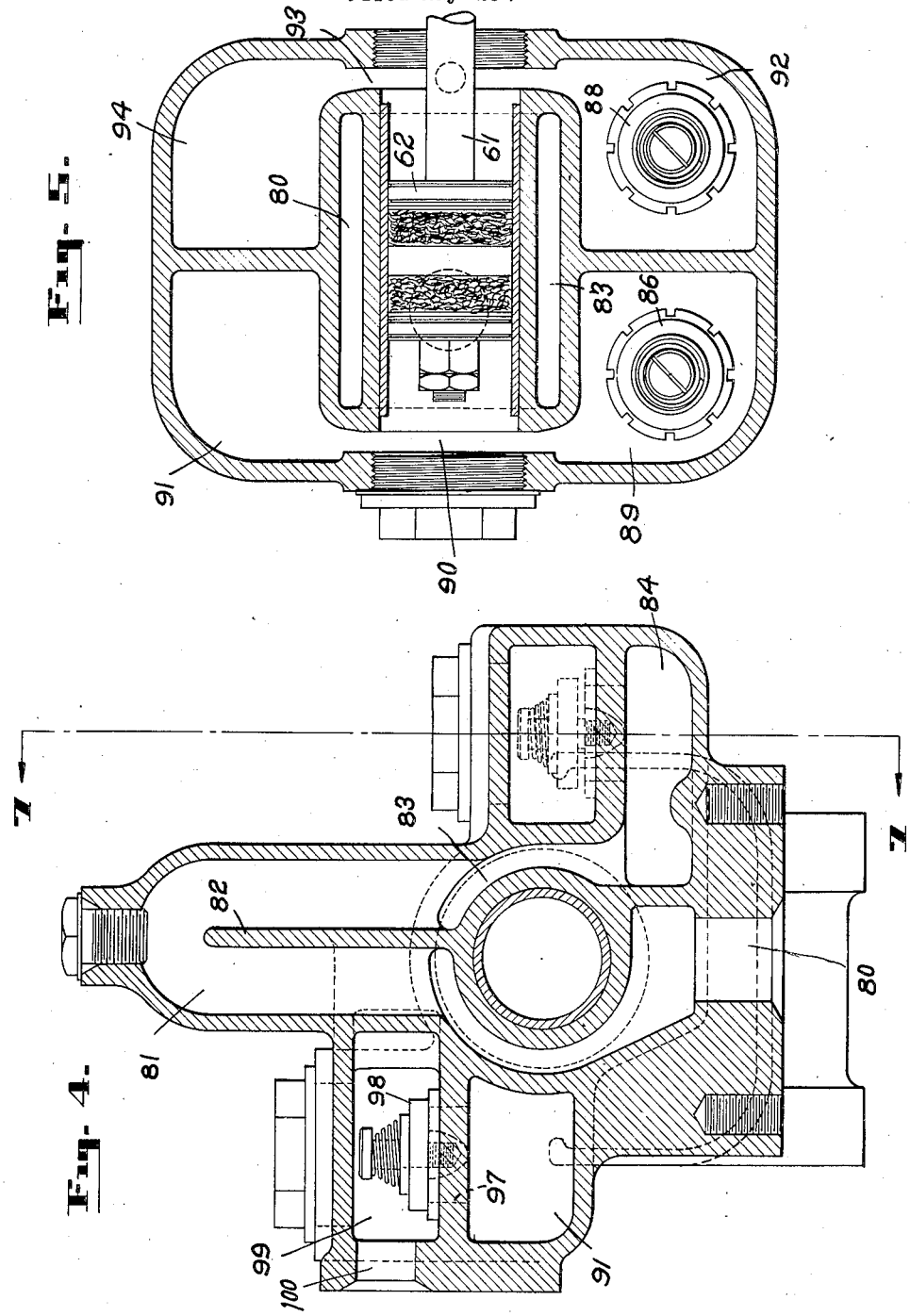

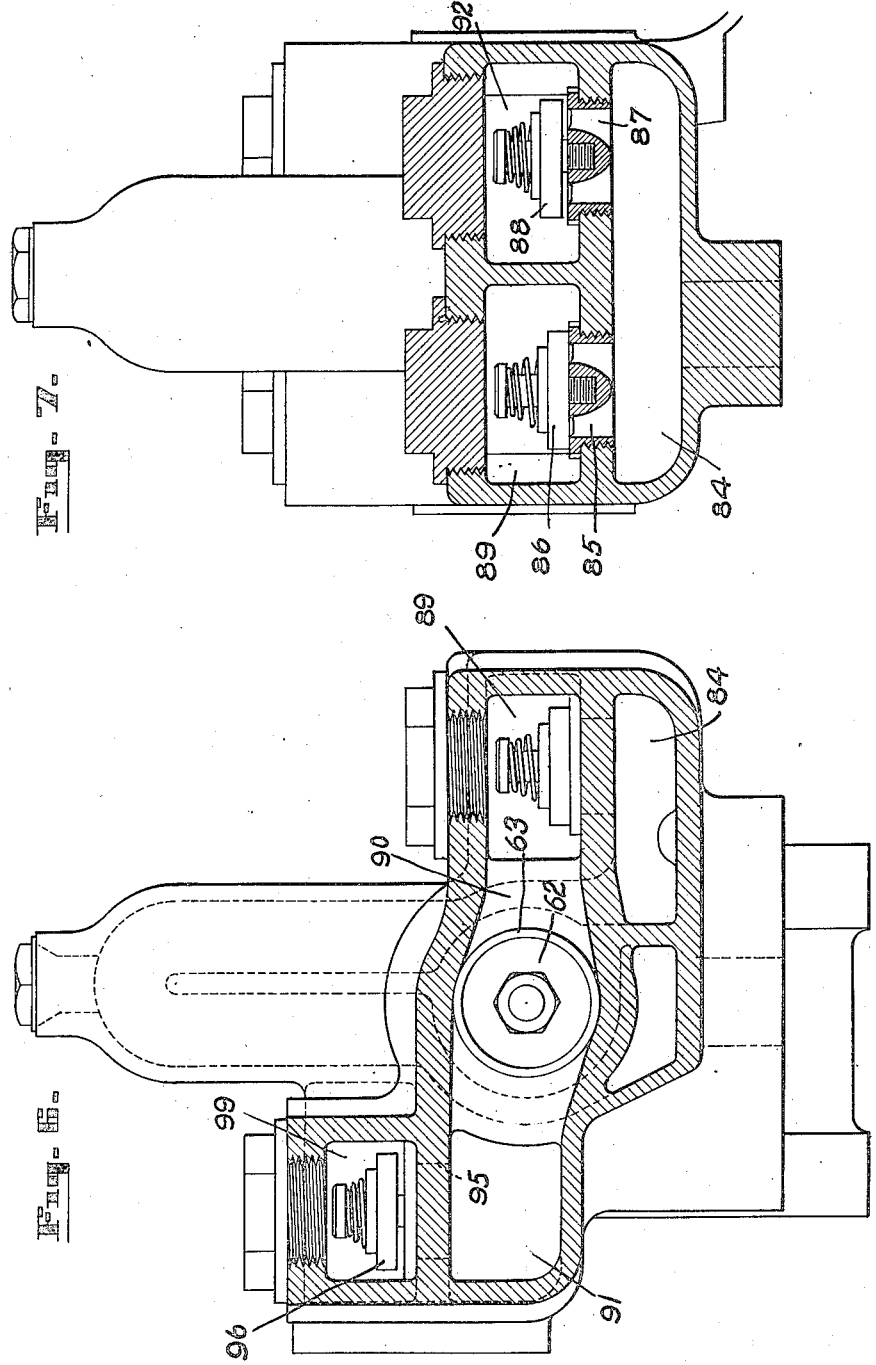

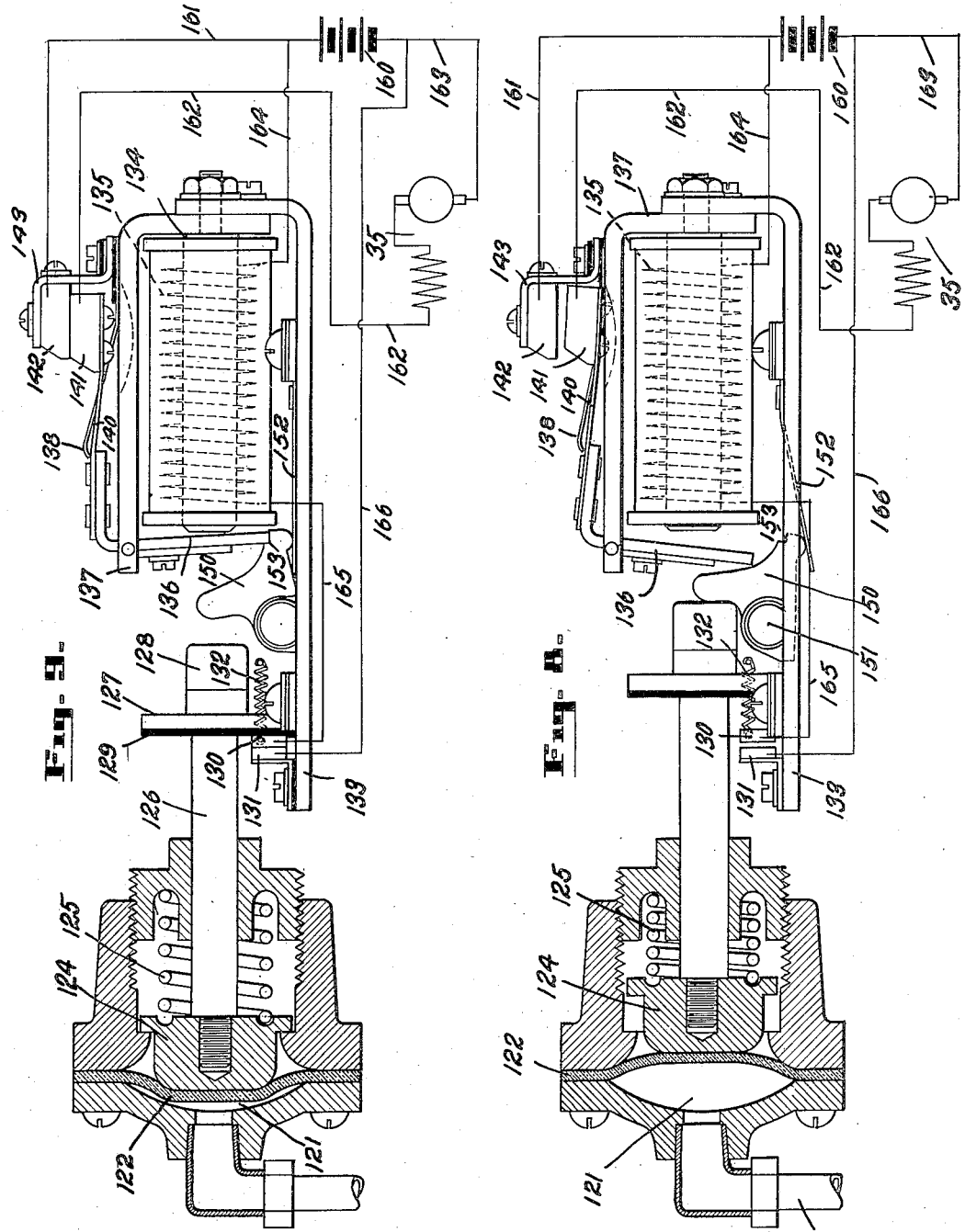

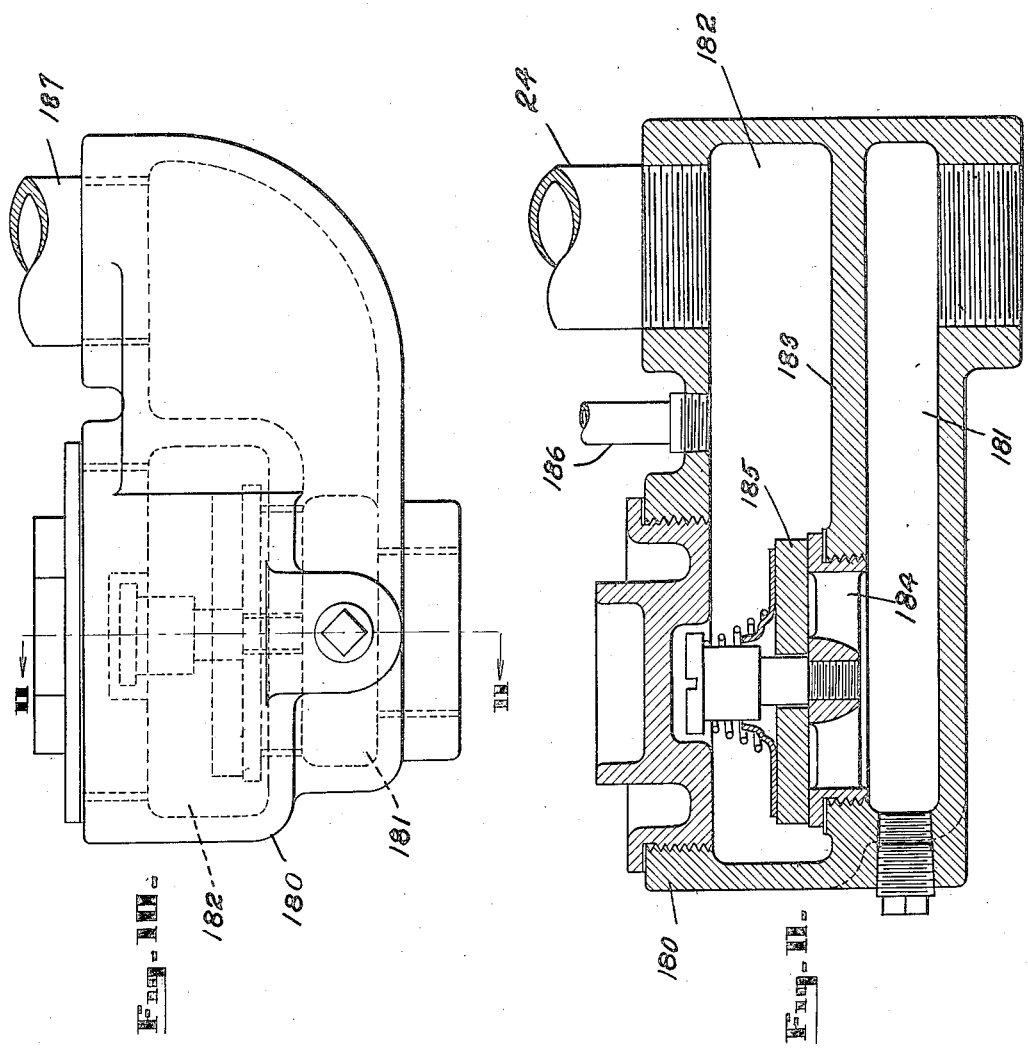

1,512,029

UNITED STATES PATENT OFFICE.

CHARLES F. KETTERING AND GEORGE A. BUVINGER, OF DAYTON, OHIO, ASSIGNORS, BY MESNE ASSIGNMENTS, TO DELCO-LIGHT COMPANY, OF DAYTON, OHIO, A CORPORATION OF DELAWARE.

WATER SYSTEM.

Application filed May 23, 1919. Serial No. 299,195.

*To all whom it may concern:*

Be it known that we, CHARLES F. KETTERING and GEORGE A. BUVINGER, citizens of the United States of America, residing at Dayton, county of Montgomery, State of Ohio, have invented certain new and useful Improvements in Water Systems, of which the following is a full, clear, and exact description.

This invention relates to water systems, and particularly for supplying water for domestic purposes where city water is unavailable. Such water systems include a pump driven by a suitable power device such as an electric motor.

One object of this invention is to increase the efficiency of operation of water systems by providing a pump unit in which the consumption of power medium for operating the unit will be proportional to the demand for water.

It is a further object to provide for the delivery of substantially fresh water at all times to any desired part of the water system.

It is a further object of the invention to provide means for automatically effecting the operation of the pump unit whenever water is demanded of the system, and for stopping the operation of the pump during a period when no water is taken from the system.

It is a further object to combine the operating elements of the system in a unitary structure in order to facilitate manufacture and ease of installation, and in order to obtain compactness and to reduce the amount of space required.

Other and further objects and advantages of the present invention will be apparent from the following description, reference being had to the accompanying drawings, wherein a preferred embodiment of one form of the present invention is clearly shown.

In the drawings:

Fig. 1 is a side elevation of a pump unit and tank combined in a unitary structure;

Fig. 1ᵃ is an elevational view of the pump connections located below the line A—A in Fig. 1;

Figs. 2 and 3, taken together, form a longitudinal sectional view of the pump unit;

Fig. 4 is a sectional view taken on the line 4—4 of Fig. 1;

Fig. 5 is a sectional view taken on the line 5—5 of Fig. 1;

Fig. 6 is a sectional view taken on the line 6—6 of Fig. 1;

Fig. 7 is a sectional view taken on the line 7—7 of Fig. 4;

Fig. 8 is a view of the pump controlling mechanism in one of its limiting positions, certain parts being shown in section;

Fig. 9 is a view similar to Fig. 8, certain of the pump controlling elements being shown in their other limiting positions;

Fig. 10 is an end view of the priming chamber check valve included in the pump inlet pipe; and Fig. 11 is a sectional view on line 11—11 of Fig. 10.

Referring to the drawings, 20 indicates a storage tank which is supported on a frame 21. Frame 21 includes a platform 22, upon which is supported a pump unit designated as a whole by numeral 23. Pump inlet pipe 24 connects the pump unit with a source of water supply, not shown, and the pump outlet pipe 25 connects the pump unit with the tank 20. The tank outlet pipe 26 delivers water from the tank to the place of consumption, and the tank is provided with a water level gage 27 and pressure gage 28.

Referring particularly to Figs. 1, 2 and 3 the pump unit 23 includes a pump frame 30 which supports certain of the pump operating elements, the pump displacement chamber or cylinder and the passages connecting the pump valves with the displacement chamber and an inlet and outlet. Frame 30 is provided with legs 31 which support said frame on the platform 22. Frame 30 supports a gear case 32 secured thereto by means of screws 32ᵃ. Upon gear case 32 is secured by bolts 33 the end frame 34 of a motor 35. The armature shaft 36 is journalled within bearings 37 and 38 which are mounted in the gear case 32. Shaft 36 carries a fly-wheel 39 in which energy may be stored for steadying the action of the pump. The hub of wheel 39 is provided with oil throwing projections 40 cooperating with oil grooves 41 and 42 for the purpose of preventing oil from entering motor 35.

Shaft 36 is provided with a worm 50 which engages a worm gear 51 mounted on shaft 52 which is journalled within bearings 53 carried by the pump frame 30. Shaft 52 carries an eccentric 54 which engages strap 55 formed integrally with a connecting rod 56. Rod 56 engages a wrist pin 57 carried by a cross-head 58 which is mounted to slide between guides 59 and 60 provided on pump frame 30 and gear case 32 respectively.

Cross head 58 is connected by means of piston rod 61 with piston 62 which slides within a cylinder sleeve 63 mounted within a displacement chamber 64 of the pump unit. Pump frame 30 carries a bushing 65 supporting the piston rod packing 66, packing gland 67 and the packing gland nut 68, by means of which escape of water from the pump is substantially prevented. Should any water escape it will collect in a chamber 69 formed in pump frame 30 and this water may be drained off through an outlet 70. The drip chamber is enclosed by a removable cover 69ª.

Oil is introduced into the chamber 71 by removing the plug 72 and pouring in oil which will flow into the chamber 71 through passage 73. By removing plug 74 oil may be drained from chamber 71.

The pump inlet pipe 24 communicates with passage 80 formed in the pump frame 30, which passes around one side of the displacement chamber wall and communicates with a priming chamber 81 which is divided by a partition wall 82 extending up from the displacement cylinder and terminating short of the upper wall of the priming chamber 81. A passage 83 extending around the displacement cylinder on the opposite side from the passage 80 leads from the priming chamber 81 into a chamber 84. The upper wall of chamber 84 is provided with an opening 85 normally closed by valve 86 and with an opening 87 normally closed by a valve 88. Opening 85 leads into a chamber 89 which is connected by a passage 90 with a chamber 91. Opening 87 leads into a chamber 92 which is connected by a passage 93 with a chamber 94. The upper wall of chamber 91 is provided with an opening 95 normally closed by valve 96, and the upper wall of chamber 94 is provided with an opening 97 normally closed by a valve 98. Both openings 95 and 97 connect chambers 91 and 94 with the pump outlet passage 99, which in turn is connected by passage 100 with the pump outlet pipe 25.

The operation of the pump will now be described. Electric current is turned into the motor 35 in a manner to be explained later causing it to rotate and impart rotary motion to shaft 52 through the gearings 50 and 51. Rotation of shaft 52 effects the reciprocatory movement of the pump piston through the eccentric 54, connecting rod 56, and piston rod 61. Before the pump can draw water the priming chamber 81 is filled entirely full of water, this will insure that all passages from the source of water supply up through the pump and including the passage 85 are filled with water. Assume that in Figs. 2 and 3, the motion of the piston 62 is taking place from left to right. When this occurs a partial vacuum is being created in the displacement chamber to the left of piston 62. Atmospheric pressure acting upon the surface of the water at the source of water supply will force water up through the passage 80, chamber 81, passage 83 and chamber 84. The water under pressure in chamber 84 will lift valve 86 from its seat permitting water to enter passages 89, 90 and 91 and to occupy the spaces in the displacement cylinder left by piston 62. On the return stroke of the piston toward the left as viewed in Figs. 2 and 5, valve 86 will remain closed and valve 96 will open to permit water being forced out through passage 95 into the pump outlet passage 99. While these movements of piston 62 are taking place valves 88 and 98 will move in similar fashion or in the reverse order, that is, when piston 62 moves to the right valve 88 will remain closed while valve 98 will be opened to permit the exit through passage 97 of any substances included in chamber 92, passage 93, and chamber 94. In this manner there is a discharge of water into passage 99 with each stroke of the piston, and to take the place of this discharge there is a corresponding flow of water into the chambers 89 and 92 from chamber 84.

The water discharged from the pump flows through pump outlet pipe 25 into the tank 20 which is closed to the atmosphere. In the tank 20 a certain quantity of water is permitted to accumulate, for example, to the level indicated by the line 110. The tank is so constructed that when the level of the water has reached a predetermined height the water will be maintained under a predetermined pressure under the action of the air which is trapped in the tank above the level 110. This predetermined pressure is sufficient to obliterate any fluctuation in the flow of the water due to the action of the pump.

The pipe 24 is directly connected with priming chamber check valve 180 including inlet passage 181 and outlet passage 182 which are separated by partition 183. Partition 183 is provided with an opening 184 normally closed by spring depressed valve 185 which is arranged to be opened by water pressure. Passage 182 is connected by means of pipe 186 with pipe 123 so that outlet passage 182 is kept full of water. Passage 181 is connected with a pipe 187 closed at the upper end by cap 188, see Fig. 1. Pipe 189 leads from passage 181 down to the source of water supply and is provided at its lower end with a foot valve 190 which is provided with inlet passages 191 and a flap valve 192 acting on a seat 193.

The function of valve 190 is to maintain the pipe leading to the pump in a primed condition and to serve as a strainer. In case this valve 190 or pipe 189 should leak and said pipe 189 lose its prime, the priming chamber check valve 180 will cause sufficient water to be maintained in the pump inlet pipe line to allow the pump to function properly.

The function of pipe 187 is to prevent "water hammer." Each time the reciprocations of the pump are terminated the flow of water from the source of supply is suddenly stopped. When this flow ceases the kinetic energy of the moving mass of water is absorbed by a sudden pounding against the walls of the pipes and the passages of the pump, producing a noisy clattering sound known as "water hammer." Above the level of the water in pipe 187 an air pocket is provided and this air serves as a cushion to absorb the shock whenever the motion of the water is arrested.

Sometimes there is not enough air in tank 20 so that when the water has reached the predetermined level 110 the air above the water level will not have attained the desired pressure. This may be due to the absorption of air by the water in said tank 20. More air may be introduced by opening air adjustment valve 200 which is connected with passage 201. This valve allows the entrance of air to the water system when the pump is actuated, but prevents the exit of water.

If the pressure in tank 20 exceeds a predetermined amount, a relief valve 210 will open automatically to allow the escape of a quantity of water from tank 20 so that the correct predetermined high pressure may be maintained.

The devices for automatically effecting the stopping and starting of the pump will next be described. The gear case 32 supports the control housing 120 in which is located the mechanism for controlling the starting and stopping of the motor. A pressure chest 121 closed on one side by a diaphram 122 is connected by pipe 123 with the tank 20. A plunger 124 under the pressure exerted by a spring 125 normally holds the diaphram in the position as shown in Fig. 9. Plunger 124 is connected to a rod 126 carrying a disc 127 and a head 128. Disc 127 is provided with a face 129 of insulating material which is adapted to engage against the contact 130 and hold said contact 130 in engagement with contact 131. Contact 130 is arranged to be separated from the contact 131 by means of the spring 132 or contact 130 may be mounted on a leaf spring arranged normally to maintain contacts 130 and 131 apart. Contacts 130 and 131 are mounted upon a frame 133 which is mounted upon gear case cover 32$^b$.

Frame 133 supports a magnet core 134 upon which is mounted magnet winding 135. An armature 136 supported upon an L-shaped armature frame 137 cooperates with this magnet winding 135. Normally armature 136 is held away from magnet 135 by means of a leaf spring 138 fixed at one end upon armature support 137 and bearing at its other upon one end of said armature. Armature 136 carries a switch arm 140 carrying a carbon contact block 141 which cooperates with a carbon contact block 142 supported upon a bracket 143 mounted on the armature support 137.

An armature latch 150 is pivotally mounted at 151 upon the frame 133, and a leaf spring 152 fixed at one end upon frame 133 tends to press the latch 150 upwardly in engagement with the armature 136.

A battery 160 or other source of current is connected by wire 161 with contact 142. Contact 141 is connected by wire 162 with motor 35 which in turn is connected by wire 163 with the battery 160. Magnet 135 is connected at one end by wire 164 with wire 161 and the other end is connected by wire 165 with contact 130. Contact 131 is connected by wire 166 with wire 163.

The operation of the pump controlling device is as follows: Let it be assumed that the controlling elements are in the position shown in Fig. 8, in which the pressure in the tank has reached the predetermined high value and the water is at the predetermined high level indicated at 110. When water is supplied from the system, the water in tank 20 will fall below the level 110 to, say, the level 110$^a$, permitting the air in the tank 20 to expand and to be reduced in pressure. This reduction in pressure has been communicated through pipe 123 to the diaphragm 122 allowing the spring 125 to move the diaphragm 122 to the position as shown in Fig. 9. When this occurs the face 129 of disc 127 will engage contact 130 and force it into engagement with the contact 131. Current will then flow from the battery 160 through wire 164, magnet 135, wire 165, contacts 130 and 131, wire 166, wire 163 to battery. The magnet 135 will be energized causing the attraction of the armature 136 toward the core 134, and the consequent engagement of contact 141 with contact 142. Armature 136 will be held in this position for a period by the cooperation of said armature with notch 153 provided in latch 150. When this occurs current will be delivered to the motor whereby said motor will operate the pump in the manner described.

The pump may continue to operate as long as water is being consumed, but should the demand of water cease, the water level in tank 20 will rise causing an increase in pressure in the tank and a consequent increase of pressure in the chest 121. Eventually the diaphragm 122 will move the plunger 124 to the right as viewed in Figs. 8 and 9, first causing the opening of contact 130 and the de-energizing of the magnet 135, and finally causing the engagement of the head 128 upon latch 150 in such a manner as to cause said latch to move clockwise as viewed in Figs. 8 and 9 whereupon the notch 153 will be free of the armature 136 and will permit said armature to return to the position shown in Fig. 8 under the action of the spring 138. The contact 141 will be separated from contact 142 under the action of spring 138 and the motor will be disconnected from the battery and will cease to operate. It is apparent therefore that when the pressure in tank 20 reaches a predetermined low limit the operation of the pump will commence and will continue until the pressure in the tank reaches a predetermined higher level and whereupon the operation of the pump will automatically cease.

The relation of the pump to the tank in the system is such that the pump has a capacity sufficiently great to take care of any large demand which may be made upon the system. The capacity of the tank is such that it will take care of a limited number of small demands which may be frequently made upon the system so that the pump need not operate every time a small quantity of water is taken from one of the faucets. The capacity of the tank is limited, however, so that where an average demand of water is made upon the system the amount of water which it is necessary to remove from the tank before the pump will start to operate is comparatively small. In fact the tank is not used as a reserve strorage supply, but to make possible the automatic starting of the pump when the pressure reaches the low limit and the automatic stopping when the pressure reaches the high limit. Water is therefore supplied to the faucets direct from the source of supply and therefore the water supplied by the present system is practically fresh at all times.

The above relations of pump and tank capacities and the marked advantages flowing therefrom may best be understood by an example and for this purpose reference is made to the accompanying drawings in which 20 is an eleven-gallon tank and pump 23 has an output of 300 gallons per hour, sufficient to meet any large demand in the present system. The system operates between pressures of 25 pounds and 50 pounds, that is, the pump begins to operate when the pressure in tank 20 falls to approximately 25 pounds and it stops when the pressure rises to approximately 50 pounds. The level of the water in tank 20 corresponding to the low pressure of 25 pounds is indicated at 110$^a$, this being the level to which the water rises upon compression of the original volume of air in the tank from atmospheric pressure, or 15 pounds absolute pressure, to 25 pounds above atmosphere, and the water level corresponding to the high pressure of 50 pounds is indicated at 110. Upon a small demand for water in the system the water level falls from the level 110 but the pump does not start until the pressure falls to 25 pounds, corresponding approximately to the level 110$^a$. The amount of water that may be withdrawn before the water starts is a little less than two gallons, or a fraction of the per-minute output of the pump, and this is sufficient to supply a few basins full or a bucket full of water.

This apparatus, then, illustrates how the principal objects of the invention are achieved. The present invention has the advantages of a tankless installation in that it supplies substantially fresh water at all times while avoiding the disadvantage of such an installation in the starting and stopping of the pump in response to every demand or as a result of leaks at the faucets; and at the same time it overcomes the disadvantage of the large-tank installations in which it is frequently necessary to install special fresh water faucets in the line between the pump and the tank or to drain the large tank before fresh water is secured. A further advantage is found in a decided decrease in current consumption and hence an increase in efficiency of the present system as compared with the large-tank type of installation. For example, in the latter type of installation, which is commonly provided with a 100 gallon tank, the amount of water that may be withdrawn from the tank before starting the motor, operating between pressures of 25 and 50 pounds, is about 20 gallons. When the pump starts to operate it must return 20 gallons to the tank before it can stop and it must pump against a pressure which gradually increases from 25 to 50 pounds, the average pressure for the 20 gallons being over 37 pounds. In the present invention, on the other hand, the pressure quickly falls to 25 pounds at which pressure the pump then operates until the demand is met, after which the pump operates only a short time at the higher average 37-pound pressure to restore the water withdrawn from the small tank. Still another advantage is the saving in original cost as compared with the large-tank installation. Further the combining of the pump, driving mechanism, power device and tank in a compact unitary structure possesses advantages from the installation view-point. There are but two very simple plumbing connections to be made, one with the source of water supply and the other with the house service pipes where the pump is used for domestic purposes. The electric connection to be made with the motor is of the simplest form.

As is clearly shown in Fig. 1, the pump unit which includes the pump, the power device and control therefor, has its pump portion extending beyond the legs 31 so that the pipe 24 and 25 may be readily attached to the pump. The motor 35 is carried at the opposite end of the gear casing. By constructing the pump unit as shown, the strain and stress caused by the overhanging pump and motor are distributed to both ends of the gear casing. This arrangement of the pump unit also greatly facilitates the method of lubricating the entire pump unit in that the lubrication of the unit is in this manner confined within the gear casing. Since all of the bearings of the armature shaft 36, the bearings for the worm gear 52, the worm gear, the sleeve 59 and guide 58, are all contained within the gear casing, the lubricant splashed therein by the worm gear 51 will be thrown upon all of these parts whereby lubrication is assured for all the moving parts.

It will be noted that a series-wound electric motor is employed for operating the pump. While a series motor is shown, it is to be understood that any power device may be used, but preferably one in which the consumption of power medium and the speed of operation is commensurate with the demand for water. The pump is so arranged that the greater the demand for water at a given elevation the greater will be the speed of the motor and pump to meet the demand. In other words, if one faucet was being used and another was opened, this additional flow of water would cause the pressure in the tank against which the pump is worked to fall off. The speed of the pump would then increase to take care of the extra amount of water being used at the second faucet. If other faucets be opened the speed of the pump unit will further increase to meet this demand, until the maximum capacity of the pump is reached. The current consumption will vary according to the quantity of water used.

The pumping power developed by the pump will vary according to the height to which water is to be elevated by the system, but, of course, the maximum speed attained by the pump will be less as this elevation above the pump increases. However, this feature is consistent with the fact that in practice the faucets in a water system which are located at the higher elevation are few in number compared with those at lower elevations relatively to the pump.

Whether there be a variation in demand or a variation in pressure head, the power consumption will vary accordingly and will be commensurate therewith.

It is to be noted that the motor is geared direct to the pump. There are no belts or chains to become broken or to be accidentally slipped from place causing the motor to run wild. If, for some reason, the operation of the pump would be interfered with so that all pump load would be removed from the motor, the speed of the motor would be kept below a dangerous limit by the friction of the driving connections between the pump and motor.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What we claim is as follows:

1. In a water system, the combination with a pump; of means for operating the pump; a tank into which the pump delivers water under pressure; connections from the pump to a water source including a check valve; and a bleeder connecting the tank with said connections between said check valve and pump so as to maintain said pump in a primed condition regardless of leaks in connections or check valve.

2. In a water system, the combination with a pump; of means for operating the pump; a tank into which the pump delivers water under pressure; connections from the pump to a water source including a check valve; a bleeder connecting the tank with said connections between the check valve and pump so as to maintain said pump in a primed condition regardless of leaks in connections or check valve; and means to automatically control the pump so as to insure the pressure of a quantity of water in the tank for priming purposes.

3. In a water system, the combination with a pump; of means for operating the pump; connections from the pump to a water source including in a unitary structure a container divided into inlet and outlet chambers, a passage connecting said compartments normally closed by a check valve, a container connected with said inlet chamber to provide an air pocket; a tank into which the pump delivers water under pressure; and a bleeder connecting the tank with the outlet chamber.

4. In a water system, the combination with a pump; of means for operating the pump; connections from the pump to a water source including in a unitary structure a container divided into inlet and outlet chambers, a passage connecting said compartments normally closed by a check valve, a container connected with said inlet chamber to provide an air pocket; a tank below the level of the pump and into which the pump delivers water under pressure; and a bleeder connecting the tank with the outlet chamber for maintaining the pump in a primed condition.

5. In a water distribution system of the domestic type, in combination, a tank for receiving water and storing it under pressure for delivery to a supply system, a pump and piping connections leading from said pump to said tank for supplying water thereto, a driving motor for said pump, means for controlling the operation of said motor and pump, said means being responsive to a predetermined low pressure in the tank for starting the motor and to a predetermined high pressure in the tank for stopping the motor, said pump being of such a size and capacity that when driven by said motor it has a stated output sufficient to supply a large demand in said distribution system, and said tank having a relatively small capacity whereby withdrawal of a small quantity of water from the tank will cause operation of said motor and pump.

6. In a water distribution system of the domestic type, in combination, a tank for receiving water and storing it under pressure for delivery to a supply system, a pump and piping connections leading from said pump to said tank for supplying water thereto, a driving motor for said pump, said motor having series characteristics, means for controlling the operation of said motor and pump, said means being responsive to a predetermined low pressure in the tank for starting the motor and to a predetermined high pressure in the tank for stopping the motor, said pump being of such a size and capacity that when driven by said motor it has a stated output sufficient to supply a large demand in said distribution system, and said tank having a relatively small capacity whereby withdrawal of a small quantity of water from the tank will cause operation of said motor and pump.

7. In a water distribution system of the domestic type, in combination, a tank for receiving water and storing it under pressure for delivery to a supply system, a pump and piping connections leading from said pump to said tank for supplying water thereto, a driving motor for said pump, means for controlling the operation of said motor and pump, said means being responsive to a predetermined low pressure in the tank for starting the motor and to a predetermined high pressure in the tank for stopping the motor, said pump being of such a size and capacity that when driven by said motor it has a stated output per minute sufficient to supply a large demand in said distribution system, and said tank having a relatively small capacity whereby upon withdrawal therefrom of a quantity of water equivalent to a fraction of the minutely output of the pump said motor and pump will be brought into operation.

In testimony whereof we affix our signatures.

CHARLES F. KETTERING.
GEORGE A. BUVINGER.

Witnesses:
J. H. McDONALD.
MILDRED PEARE.